United States Patent [19]

Vetter

[11] Patent Number: 4,707,393
[45] Date of Patent: Nov. 17, 1987

[54] METHOD FOR MAKING HOLLOW MULTILAYER MULTIPLE-WALL SYNTHETIC RESIN PANELS

[75] Inventor: Heinz Vetter, Rossdorf, Fed. Rep. of Germany

[73] Assignee: Röhm GmbH, Darmstadt, Fed. Rep. of Germany

[21] Appl. No.: 552,924

[22] Filed: Nov. 18, 1983

[30] Foreign Application Priority Data

Dec. 4, 1982 [DE] Fed. Rep. of Germany ....... 3244953

[51] Int. Cl.$^4$ .......................... B29C 47/06; B32B 3/12; B32B 27/36; B32B 31/30
[52] U.S. Cl. .............................. 428/178; 156/244.13; 264/173; 264/209.8; 264/211.12; 264/211.23; 264/514; 264/568; 428/412
[58] Field of Search .................... 264/171, 173, 177 R, 264/209.8, 514, 568, 211.12, 211.23; 156/244.13; 428/178, 412

[56] References Cited

U.S. PATENT DOCUMENTS

| | | | |
|---|---|---|---|
| 3,274,315 | 9/1966 | Kawamura | 264/177 R |
| 3,467,570 | 9/1969 | Baxter et al. | 264/177 R |
| 3,561,493 | 2/1971 | Maillard | 264/173 |
| 3,582,398 | 6/1971 | Ringler . | |
| 3,741,857 | 6/1973 | Kakutani et al. | 264/177 |
| 3,888,617 | 6/1975 | Barnett | 425/326.1 |
| 4,214,026 | 7/1980 | Ibata et al. | 428/67 |
| 4,271,103 | 6/1981 | McAlister | 425/326.1 |
| 4,296,062 | 10/1981 | Gauchel et al. | 264/173 |
| 4,371,326 | 2/1983 | McAlister | 425/326.1 |

FOREIGN PATENT DOCUMENTS

| | | |
|---|---|---|
| 0065619 | 12/1982 | European Pat. Off. . |
| 1694273 | 5/1976 | Fed. Rep. of Germany . |
| 2832676 | 2/1980 | Fed. Rep. of Germany . |
| 2028228 | 3/1983 | United Kingdom . |

Primary Examiner—Jeffery Thurlow
Assistant Examiner—Leo B. Tentoni
Attorney, Agent, or Firm—Curtis, Morris & Safford

[57] ABSTRACT

A plastic multilayer multiple-wall panel, manufactured by the coextrusion of a plurality of adhesively bonded layers of thermoplastically extrudable synthetic resins by means of a multicomponent extrusion die, and comprising a supporting core layer of polycarbonate resin with a plurality of continuous hollow chambers, a UV absorption layer, boned on one or both sides of said core layer and made of a synthetic resin containing at least 2 weight percent of a UV absorber that is volatile at elevated temperatures, and a cover layer, on that side of the UV absorption layer which faces away from the core layer, of a synthetic resin which contains less than 2 weight percent of volatile UV absorber.

2 Claims, 1 Drawing Figure

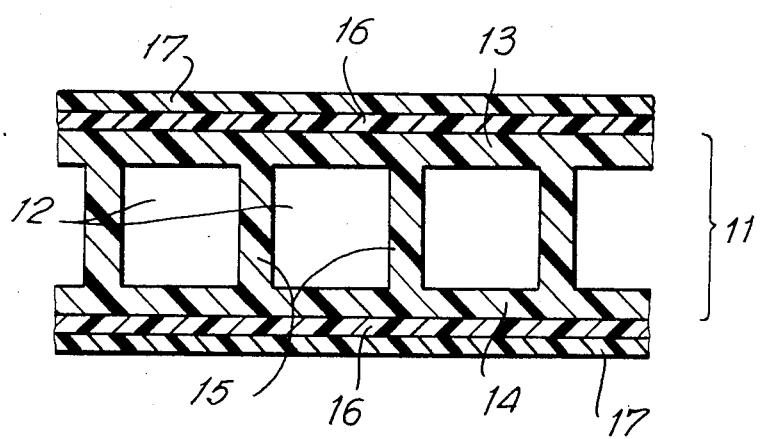

METHOD FOR MAKING HOLLOW MULTILAYER MULTIPLE-WALL SYNTHETIC RESIN PANELS

The present invention relates to hollow multilayer multiple-wall synthetic resin panels and to methods for making the same.

More in particular, said panels comprise a supporting core layer of polycarbonate resin which on at least one side is bonded to an ultraviolet absorbing layer of synthetic resin containing a volatile UV absorber. This latter layer prevents degradation of the surface of the core layer of polycarbonate resin under the action of UV radiation. Without such a UV absorption layer, that surface would become dull, cracked, and brittle.

According to published German patent application DAS No. 1 694 273, a coating formed of three parts of a UV absorber and five parts of polymethyl methacrylate, for example, is painted on polycarbonate panels. In accordance with published German patent application DOS No. 28 32 676, UV absorbing layers are produced by coextrusion with a core layer of polycarbonate resin by means of a multicomponent die. There mention is further made of the possibility of the simultaneous coextrusion of three layers to form solid sections overlaid on both sides, wherein a middle layer of polymethacrylate resin, disposed between the core layer and the cover layer, acts as an adhesion promoter and possibly also contains a UV absorber.

Most of the commonly used UV absorbers for synthetic resins are volatile at temperatures within the range of the manufacturing and processing conditions for polycarbonate panels, that is to say that exude from the absorption layer and deposit on the sizing die or form a thin but troublesome film on the surface of the plastic panel. This effect occurs especially with high UV absorber concentrations, particularly concentrations of about 0.5 weight percent and up. It is particularly troublesome when the UV absorption layer is produced by coextrusion with the core layer, and especially when the core layer comprises hollow spaces and the extruded plastic panel passes through a vacuum forming channel. The UV absorber oozing out of the absorption layer may deposit in the vacuum orifices of the forming channel and gradually plug them up.

The present invention has as its object the avoidance of the troubles which are caused by exudation of a UV absorber from a multilayer panel during its manufacture, processing, or use at elevated temperatures. In accordance with the invention, this object is accomplished by making a multilayer multiple-wall synthetic resin panel by the coextrusion of a plurality of adhesively bonded layers of thermoplastically extrudable synthetic resins into a multilayer strand consisting of a core layer of polycarbonate resin having a plurality of continuous hollow chambers and, on at least one side of said core layer, a UV absorption layer formed of a synthetic resin containing a volatile UV absorber. More in particular, the core layer is bonded in a multicomponent extrusion die on at least one side with a UV absorption layer containing at least 2 weight percent of a volatile UV absorber. On the side facing away from the core layer, the UV absorption layer is bonded by coextrusion to a cover layer containing less than 2 weight percent of volatile UV absorbers. After emerging from the extrusion die, the multilayer strand is processed further in a vacuum forming channel. While some migration of UV absorber into the cover layer may occur also in this case, it has been found that its concentration at the surface of the cover layer will not be high enough to result in appreciable volatilization or migration of the UV absorber at elevated temperatures.

The technology of manufacturing hollow multilayer multiple-wall synthetic resin panels by the coextrusion of a plurality of adhesively bonded layers of thermoplastic synthetic resins by means of a multicomponent extrusion die fed by a plurality of extruders is known in the art. Reference is made in this connection to published European patent application EP-A No. 65619, for example.

A better understanding of the present invention and of its many advantages will be had by referring to the accompanying drawing, in which the figure is an end view, in section, of a hollow multilayer multiple-wall synthetic resin panel.

The figure shows such a panel including core layer 11 comprising a plurality of plane parallel walls 13 and 14 interconnected by partitions or supports 15 with which said walls are integral. This structure defines a plurality of continuous hollow chambers 12 which extend rectilinearly and preferably parallel to one another through core 11. One or both outer sides of core layer 11 are provided with UV absorption layer 16 which firmly adheres to said core layer and differs from the latter in having a higher content of a UV absorber. On the outer side of UV absorption layer 16 is found cover layer 17, which prevents volatilization or exudation of the UV absorber from layer 16, or reduces it to a level at which it is not troublesome.

Core layer 11 forms the supporting layer of the plastic multilayer multiple-wall panel. It is this layer that provides the major strength properties, UV absorption layers 16 and cover layers 17 being of minor importance in this respect. As a rule, the external sides of the core layer are parallel to each other and plane; however, they may also be corrugated or, especially in the installed condition, curved about one axis. Walls 13 and 14 and partitions 15 usually are from 0.3 to 2 mm thick. The thickness of the core layer, including the hollow chambers, may range from 3 to 60 mm, for example, and preferably ranges from 4 to 16 mm. The areal expanse and form of the core layer depend on the end-use requirements and may be as desired, subject to the technical manufacturing conditions., Panels which are to be installed flat are preferably rectangular and have edge lengths ranging from 0.5 to 6 meters.

Absorption layer 16 should be of sufficient thickness to absorb over 90 percent, and preferably over 99 percent, of unreflected UV radiation between 280 and 380 mm perpendicularly incident thereon. A thickness ranging from 5 to 50 microns will suffice; however, layers as thick as 100 microns may be applied.

As mentioned earlier, cover layer 17 need be only thick enough to prevent volatilization or exudation of the UV absorber, or to reduce it to a level at which it is not troublesome. A thickness ranging from 5 to 100 microns, and generally from 5 to 50 microns, will usually suffice.

Core layer 11 consists of a polycarbonate resin. UV absorption layer 16 may be formed of the same or a similar polycarbonate resin but differs from the core-layer material in that it has a higher UV absorber content. As a rule, the core layer is free of UV absorbers, but if desired it may contain small amounts, i.e. up to about 2 weight percent, of UV absorbers.

The polycarbonate resin usually is derived from an aromatic bisphenol or from a mixture of such bisphenols, and more particularly from bisphenol A. All polycarbonate resins which can be extruded into panels of high toughness and transparency are suited for use as materials for both the core layer and the UV absorption layer. They may be as clear as glass and colorless or conventionally tinted, opacified, or pigmented; however, the invention is of primary importance to materials with high light transmission.

As a rule, UV absorption layer 16 contains at least 0.4 g/m$^2$ of a conventional UV absorber for plastics. The UV absorber content preferably ranges from 2 to 15 weight percent but may be as high as 30 weight percent, if desired. The thinner the layer, the higher the concentration should be in order that the requisite absorption may occur within the absorption layer. Below an amount of UV absorber of 0.4 g/m$^2$, the surface of the core layer often is not reliably protected against weathering. The higher the concentration, the more effective the protection will be.

Suitable UV absorbers are 2-hydroxy-4-n-octoxybenzophenone, 2-hydroxy-4-methoxybenzophenone, 2-(2'-hydroxy-5'-methylphenyl)benzotriazole, and other derivatives of 2-hydroxybenzophenone or benzotriazole, as well as 2,4-dihydroxybenzoylfuran, phenyl salicylate, resorcinol disalicylate, resorcinol monobenzoate and dibenzoate, benzyl benzoate, stilbene, and betamethylumbelliferone and its benzoate. Many other UV absorbers are known and commercially available. The UV absorber should be homogeneously miscible, in the concentration chosen, with the plastic material.

Most of the commonly used UV absorbers are volatile in the sense that, with a content of 0.5 weight percent, noticeable sublimation occurs at 260° C. and normal pressure, and more pronounced sublimation under vacuum, attended by deposition of the vaporized UV absorber on cooler equipment components.

Cover layer 17 usually contains no UV absorber, or less than 2 weight percent thereof, and in any event less than the UV absorption layer. The UV absorber content is preferably less than 1 weight percent. The cover layer therefore consists of a material which is sufficiently resistant to degradation by UV radiation even without a substantial absorber content.

Polymethyl methacrylate or synthetic resins composed to the extent to at least 40 weight percent of methyl methacrylate are well suited for use as the cover layer. These resins may be copolymers of these monomers or polymer mixtures including sufficient methyl methacrylate so that total amount of methyl methacrylate monomeric units is at least 40 percent, and preferably at least 50 percent, of the total weight of the cover layer. Suitable copolymers contain from 75 to 90 weight percent of methyl methacrylate, for example, the rest being acrylic esters having from 1 to 8 carbon atoms in the alcohol portion or methacrylic esters having from 2 to 8 carbon atoms in the alcohol portion. $C_2$ to $C_4$ alkyl groups are preferred.

Except for its UV absorber content, the material of which UV absorption layer 16 is made may be identical with the polycarbonate resin of core layer 11 or with the material of cover layer 17. Plastics having an elongation at break of at least 3.5 percent are preferred. In accordance with a preferred embodiment of the invention, UV absorption layer 16 consists of a polycarbonate resin, and more particularly of the same resin as core layer 11.

The multilayer panels of the invention are manufactured by the coextrusion of all layers. This means that the synthetic resins of all layers must be extrudable under approximately identical conditions. A multilayer die is used to which at least three extruders, for respective production of the core layer, the UV absorption layers, and the cover layers, are connected. The multilayer die is conventionally construced so that thin, uniform layers of the UV absorbing material and of the cover layer material are adhesively applied to one side or preferably to both sides of the core layer.

After emerging from the die, the multilayer strand is conventionally processed further in a vaccum forming channel. The latter consists of a straight tunnel, open at both ends, which is adapted to be cooled and has a free cross section that is substantially constant over its entire length and corresponds to the profile of the multiple-wall panel to be produced. Optionally, a nonconstant cross section may be employed to expand the strand passing through the tunnel, or to allow for its shrinkage during cooling. A vacuum is applied to the moving strand through holes or slots in the walls of the forming channel to force the strand to maintain contact with the walls of the forming channel while it is in the thermoplastic or thermoelastic state. The holes or slots are so small that none of the resin being formed can infiltrate. They may range in size from approximately one millimeter or ever less in the entrance zone to several millimeters in the exit zone. The holes or slots are connected to a vacuum line whih is set for a pressure that may be from 5 mm to 5 mm of water lower than atmospheric pressure. The strand is cooled to below the softening temperture in one or more forming channels arranged in a row. An apparatus and procedure for coextrusion is outlined in Michaeli, Extrusionswerkzeuge für Kunststoffe ("Extrusion Dies for Plastics"), Hanser-Verlag, Munich, 1979, pp. 301–326.

Cover layer 17 will prevent vaporization of the UV absorber. Some of the UV absorber may diffuse from UV absorption layer 16 into the adjacent region of the cover layer but normally will not penetrate as far as the surface of the cover layer. Such diffusion into the cover layer is advantageous when the UV absorption layer consists of polycarbonate resin, since UV absorption then occurs even before the radiation enters the absorption layer itself, and the outer surface of that layer then is not exposed to unattenuated UV radiation.

The panels in accordance with the invention serve as glazing and structural components, particularly for outdoor use where the side exposed to sunlight carries the cover layer. In the form of double-wall panels, they lend themselves to the fabrication of greenhouses. For that application, they are preferably curved in the longitudinal direction to form a barrel vault.

What is claimed is:

1. A method for making a hollow multilayer multiple-wall synthetic resin panel which comprises extruding a plurality of adhesively bonded layers of thermoplastically extrudable synthetic resins into a multilayer strand consisting of (1) a core layer of polycarbonate resin having a plurality of continuous hollow chambers and, on at least one outer side of said core layer, (2) a UV absorption layer of a syntheitic resin containing from 2 to 15 weight percent of a volatile UV absorber, and on that side of said absorption layer facing away from said core layer, (3) a cover layer containing less than 2 weight percent of a volatile UV absorber; and further processing said strand in a vacuum forming channel after extrusion.

2. A multilayer multiple-wall synthetic resin panel made by the method of claim 1.

* * * * *